United States Patent [19]

Vuillet

[11] Patent Number: 4,566,566

[45] Date of Patent: Jan. 28, 1986

[54] DEVICE FOR TEMPORARILY UNCOUPLING TWO COAXIAL ROTATING ELEMENTS

[75] Inventor: Jean-Pierre Vuillet, Mulhouse, France

[73] Assignee: Societe Alsacienne de Construction de Material Textile, France

[21] Appl. No.: 648,323

[22] Filed: Sep. 7, 1984

[30] Foreign Application Priority Data

Sep. 19, 1983 [FR] France ............... 83 14835
Jan. 16, 1984 [FR] France ............... 84 00710

[51] Int. Cl.⁴ .................................... F16D 11/06
[52] U.S. Cl. ........................... 192/24; 192/93 R; 192/99 S; 192/67 R; 139/1 E
[58] Field of Search ........... 139/1 E; 192/33 R, 93 R, 192/99 S, 67 R, 24

[56] References Cited

U.S. PATENT DOCUMENTS 3,169,607  2/1965  Romney ............... 192/67 R
4,244,455  1/1981  Loker ................... 192/24
4,458,725  7/1984  Schwarz ............... 139/1 E Primary Examiner—Henry S. Jaudon
Assistant Examiner—Steven Shongut
Attorney, Agent, or Firm—Cantor and Lessler

[57] ABSTRACT

The invention relates to mechanisms for uncoupling two rotating elements. The device includes a positive clutch sliding on a rotating drive element and subjected to the action of a return spring, an energy storage spring stronger than the return spring and designed to disengage the positive clutch, a cam connected to the drive element and designed to tension the energy storage spring, a pawl capable of keeping the energy storage spring tensioned, and an electromagnet intended to actuate uncoupling and connected to the pawl so as to release the energy storage spring. The device is applicable to temporary uncoupling of two coaxial rotating elements in particular in weaving looms, in order to uncouple the crankshaft from the loom and its main motor from the dobby shaft and its auxiliary control motor.

11 Claims, 8 Drawing Figures

U.S. Patent  Jan. 28, 1986  Sheet 1 of 3  4,566,566
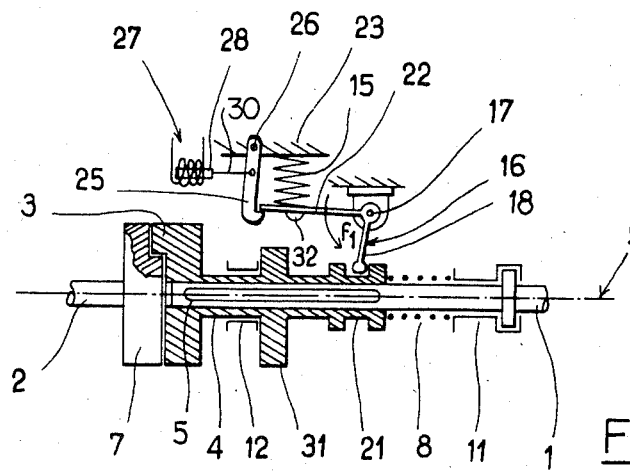
FIG_1
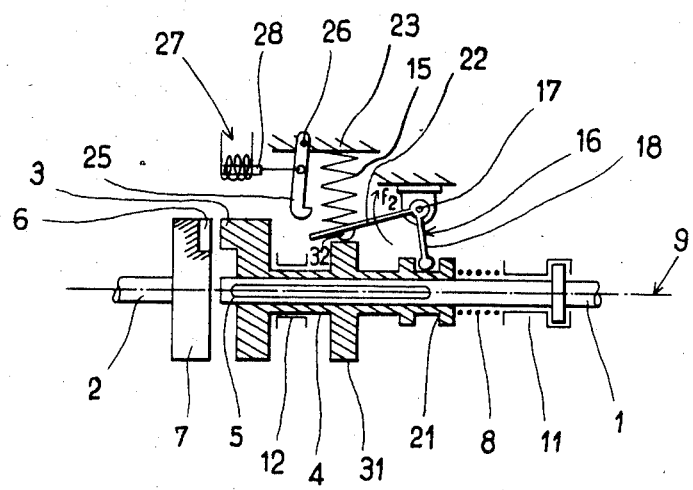
FIG_2

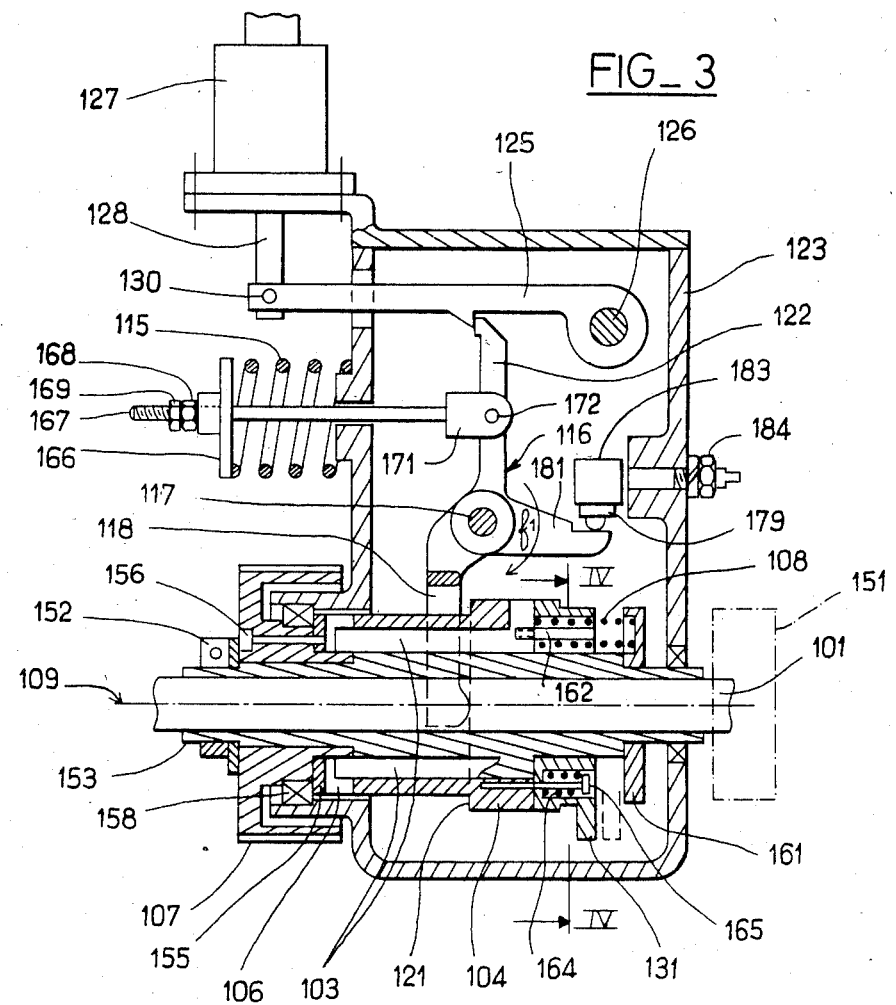
FIG_3
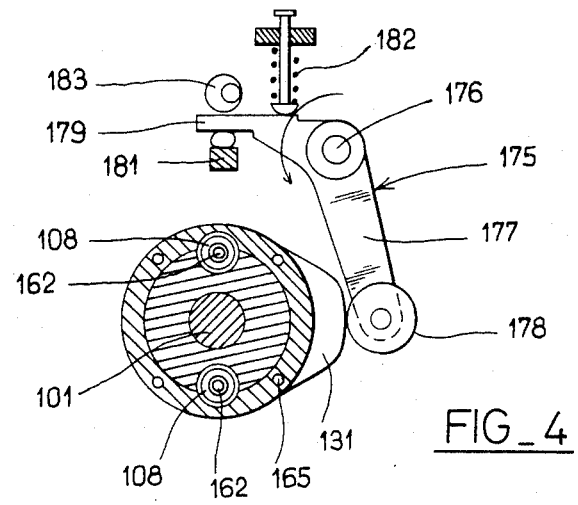
FIG_4

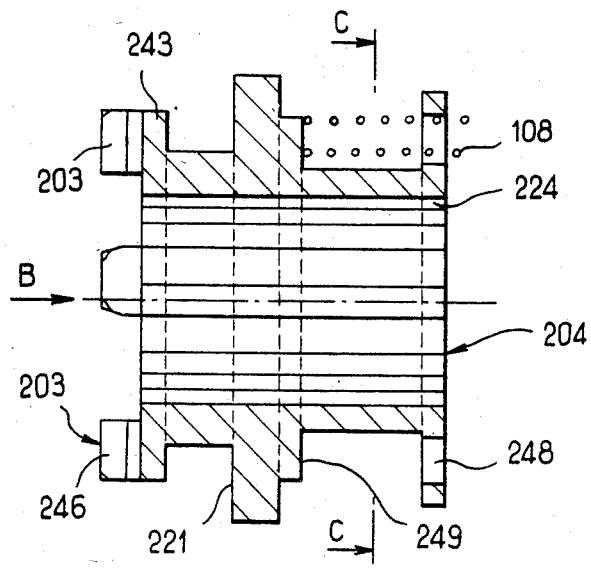
FIG_5
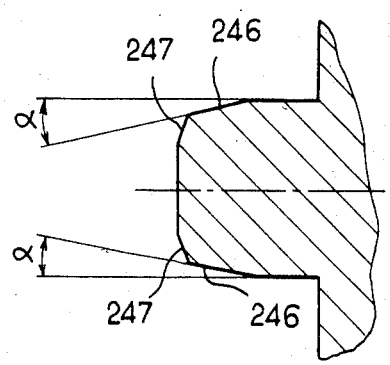
FIG_7
FIG_6a
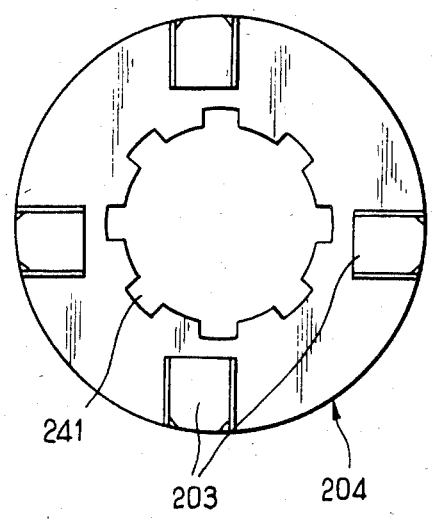
FIG_6b
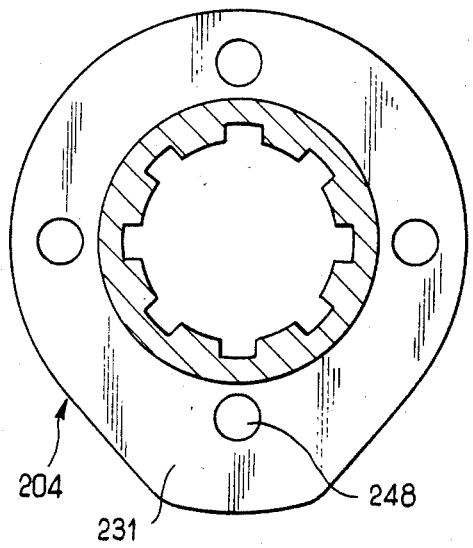

DEVICE FOR TEMPORARILY UNCOUPLING TWO COAXIAL ROTATING ELEMENTS

The invention relates to devices for temporarily uncoupling two coaxial rotating elements, at least one of which is a drive element.

Such uncoupling devices are used, for example, on weaving looms to interrupt the connection between a first rotating element connected both to the dobby of the loom and to an auxiliary motor for driving the said dobby, and a second rotating element connected both to the crankshaft and to the main motor of the loom, so that there is the possibility, when the two abovementioned rotating elements are coupled and when only the main motor is energized, of driving the dobby at high speed (for example from 300 to 500 revolutions/minute), using the main motor of the loom, by means of the two rotating elements in question, the whole loom assembly thus being in operation, and, when the two rotating elements are uncoupled, of driving only the dobby at low speed (for example at 30 revolutions/minute) using the auxiliary motor which is solely energized.

Normally, coupling of the two rotating elements is ensured by means of a positive clutch sliding on one of the said elements and subjected, in the coupling direction, to the action of a return spring and, in the uncoupling direction, to the effect of an electromagnet. However, the electromagnet must overcome not only the force of the return spring, but also the various frictional forces in the device, including the frictional forces which arise between the positive clutch and the matching element of the other rotating element with which it cooperates. As a result, it is necessary to use a relatively powerful electromagnet, i.e. a piece of equipment which is costly, bulky and consumes a great deal of electrical current.

The object of the invention is to provide an uncoupling device which has none of the abovementioned drawbacks of conventional devices.

To this end, according to the invention, the device comprises: an energy storage spring capable of acting on the sliding positive clutch in the direction in which uncoupling is performed, with a force greater than the force of the return spring; a cam which is connected to the rotating element carrying the positive clutch and which is designed to tension the said energy storage spring; a pawl designed to keep the energy storage spring tensioned; and a mechanical linkage between the pawl and the mobile armature of the electromagnet, designed to cause the release of the energy storage spring in response to the action of the electromagnet.

Owing to this special structure, all of the energy required to produce uncoupling of the two rotating elements, i.e. to overcome the force of the return spring and the frictional forces, is supplied by the energy storage spring and this energy is itself supplied beforehand to the said spring by the cam, i.e. it is taken from the rotating drive element which is sufficiently powerful for it to be able to supply this extra power without any difficulty. As a result, the electromagnet merely has to supply the minimal effort required to disengage the pawl retaining the tensioned energy storage spring, so that it can be quite small in size and consume very little electrical current.

The invention will be better understood by reading the description which follows and examining the attached drawings which show, by way of example, various embodiments of the invention.

In these drawings:

FIG. 1 and FIG. 2 show, in diagrammatic form, a first embodiment in the coupled position and uncoupled position, respectively;

FIG. 3 shows a sectional view of a second embodiment and

FIG. 4 is a partial section along the line IV—IV of FIG. 3;

FIG. 5 is a longitudinal sectional view of a sliding sleeve carrying the positive clutch, according to another embodiment of the invention;

FIG. 6a is an end view of the same sleeve, in the direction of the arrow B of FIG. 5;

FIG. 6b is a sectional view of the same sleeve, in accordance with the plane C—C of FIG. 5;

FIG. 7 shows, on a larger scale, a detail of a tooth of the sleeve shown in FIG. 1.

The device shown in FIGS. 1 and 2 is intended to allow temporary uncoupling of two coaxial rotating elements, one of which, 1, is a drive shaft and the other of which, 2, is a driven shaft. Coupling of these two elements can be ensured by a positive clutch 3 which is integrally fixed to one end of a sleeve 4 mounted in sliding fashion on the drive shaft 1 by means of a key 5 so as to be locked in rotation with the said shaft. The positive clutch 3 is able to engage in a slot 6 in a plate 7 integrally fixed to the driven shaft, under the action of a return spring 8 located, on the shaft 1, between a bearing 11 for supporting the said shaft and the end of the sleeve 4 opposite to that which carries the positive clutch 3. Another bearing for supporting the shaft 1 is denoted by 12. The common axis of the two shafts is denoted by 9.

An energy storage spring 15 is capable of acting on the sliding positive clutch 3 in the direction in which uncoupling of the shafts is performed, with a force greater than the force of the return spring 8, by mens of a lever which has several arms 16 and which can pivot on the fixed spindle 17; an end of one arm 18 of this lever is engaged in an annular groove 21 in the sleeve 4, whereas the energy storage spring 15 rests, with one of its ends, against another arm 22 of the lever 16 and, with its other end, against a fixed stop 23.

The pivoting lever 16 can be kept in the position shown in FIG. 1, the energy storage spring 15 being tensioned, by means of a pawl 25 which can pivot on a spindle 26 carried by the stop 23 and which can engage underneath the end of the arm 22 of the pivoting lever. An electromagnet 27 has a mobile armature 28 which is connected to the pawl 25 by means of linkage 30 such that energization of the said electromagnet releases the pawl from the end of the arm 22.

It is possible to move the pivoting lever 16 from the position shown in FIG. 2, which corresponds to the uncoupled position of the two shafts, into the position shown in FIG. 1, which corresponds to the coupled position of the shafts, by means of a cam 31 which is integrally fixed to the sleeve 4 and is located in line with a projection 32 on the arm 22 of the pivoting lever, when the shafts are in the uncoupled position.

Operation of the device described above with reference to FIGS. 1 and 2 is as follows:

Let us suppose that the drive shaft 1 and the driven shaft 2 are at present coupled, as shown in FIG. 1, due to the fact that the positive clutch 3, which is locked in rotation with the drive shaft 1, is kept in the slot 6 of the plate 7 of the driven shaft 2 under the action of the return spring 8. The energy storage spring 15 is kept in the compressed state by the lever arm 22 which itself is kept in this position by the pawl 25. During rotation of the shafts, the cam 31 does not act on the arm 15 since the latter is kept away from the cam by the pawl and since the cam is not opposite the projection 32 on the lever arm 22.

In order to uncouple the shafts, during one revolution, a pulse is sent to the electromagnet 27 and the mobile armature 28 of this electromagnet exercises a pulling effect on the pawl 25 which thus releases the lever arm 22. The energy storage spring 15 extends and causes the double-arm lever 16 to pivot suddenly in the direction of the arrow f1; the arm 18 of this lever then causes the sleeve 4 to slide, against the force of the weaker return spring 8, towards the right in the drawing, i.e. in the direction which disengages the positive clutch 3 from the slot in the plate 7 of the driven shaft 2. The latter is no longer driven by the drive shaft 1. The different elements of the device now occupy the positions shown in FIG. 2. However, the drive shaft continues to rotate, causing the cam 31 to rotate with it; the cam pushes the lever arm 22, thereby causing the double-arm lever 16 to pivot in the direction of the arrow f2 and compressing the energy storage spring 15 until the end of the arm 22 is hooked onto the pawl 25, as shown in FIG. 1. The positive clutch 3, under the action of the return spring 8, is pressed against the face of the plate 7 of the driven shaft 2, and, as soon as the revolution has been completed, it engages in the slot 6 of the said plate. All of the parts have returned to the positions shown in FIG. 1 and the two shafts are again coupled.

It will be noted that the energy required to compress the spring 15 is obtained from the drive shaft 1 and that the electrical energy required by the electromagnet in order to bring about uncoupling is insignificant, since the work performed by the latter consists merely in disengaging the pawl 25 from the lever arm 22. The force of the energy storage spring 15 must be considerably greater than that of the return spring 8, since the spring 15 must overcome not only the spring 8, but also the frictional forces in the device.

It will also be noted that the cam 31 is relatively narrow so that it is not in line with the projection 32 on the arm 22 of the pivoting lever when the two shafts are coupled, as shown in FIG. 1; thus, the boss on the cam 31 does not strike unnecessarily the said projection each time the drive shaft 1 rotates, for as long as the two shafts remain coupled.

Moreover, in the above description, it was assumed that there was only one positive clutch 3 cooperating with one slot 6 and that, consequently, coupling occurred again at the end of one revolution of the drive shaft the instant of uncoupling; the cam 31 therefore required only one boss. However, uncoupling could occur for shorter periods, e.g. for the duration of a half or a third of a revolution. In this case, it would be sufficient if the plate 7 of the driven shaft has two or three slots and the cam 31 two or three bosses, as required.

FIG. 3 shows another embodiment specially designed for the application indicated above, i.e. for operating the dobby of a weaving loom. In this figure, the elements corresponding to those in FIG. 1 are denoted by the same reference numbers multiplied by a hundred. Thus, the first rotating element 101 is a shaft connected permanently both to an auxiliary motor 151 and to the dobby (not shown) of a weaving loom, whereas the second rotating element 107 is a pulley intended to be connected permanently both to the crankshaft and to the main drive motor of the loom.

The shaft 101 has fixed to it, by means of a clamp 152, a housing 153 on which is mounted the sliding sleeve 104 which has an annular shoulder 121 against which the two ends of the fork-shaped arm 118 of the lever 116 rest, the said lever being mounted so as to pivot inside the supporting structure 123 of the device by means of the spindle 117. The bushing 153 contains nose keys 103; one end of each key can engage in a corresponding slot 106 of a plate 155 fixed to the pulley 107 by screws 156, whereas the other end rests, with its nose, against the sliding sleeve 104. The pulley 107 is centered inside the supporting structure 123 by a ball bearing or roller bearing 158. The return springs 108 are located in between the noses of the keys 103 and a disk 161 which is integrally fixed to the bushing 153; the said springs are centered by means of pins 162 (see FIG. 4 also) screwed into the noses of the keys. The cam 131 is held elastically against one end of the sleeve 104 by springs 164 which are housed inside the hub of the cam and which rest against the bottom of the screwheads 165 mounted in the sleeve.

The energy storage spring 115 rests, with one of its ends, against the supporting structure 123 and, with its other end, against a disk 166 retained on a threaded end of a rod 167 by a nut 168 provided with a counternut 169. The other end of the rod is provided with a clevis 171 articulated, via a spindle 172, with the arm 122 of the lever 116. It is this arm 122 which cooperates with the pawl 125 articulated, via the spindle 126 with the supporting structure 123 and connected via a spindle 130, to the mobile armature 128 of the electromagnet 127.

In this embodiment, the cam 131 does not act directly on the arm 122 of the pivoting lever, but by means of another bent lever 175 (see FIG. 4 in particular) which is situated substantially in the plane of the cam and which pivots on a spindle 176 mounted on the supporting structure 123. This lever has a first arm 177 provided with a roller 178 cooperating with the cam, and a second arm 179 designed to push, in the direction of the arrow f1 (FIG. 3), a third arm 181 of the first pivoting lever 116 so as to ensure compression of the energy storage spindle 115. A spring 182 keeps the arm 179 of the second lever against the arm 181 of the first lever, while the travel of the arm 179 is limited in the upwards direction by an adjustable stop 183 which is in the form of an eccentric mounted on a projecting part of the supporting structure 123 and the axis of which terminates in an external part with two flat surfaces for the purpose of adjustment, whilst the eccentric can be fixed by means of a nut 184.

This device shown in FIGS. 3 and 4 operates as follows:

In the position in which the device is shown in the drawing, the shaft 101 is coupled with the pulley 107 by the keys 103 which are engaged in the slots 106; the loom is operating normally, i.e. the pulley 107 is rotating, under the action of the main motor of the loom, at a speed in the order of 300 to 500 revolutions/minute, so that the shaft 101, the dobby and the non-energized auxiliary motor operate at a corresponding speed. In the case of a mishap during weaving, the main motor is stopped and, in order to uncouple the two rotating elements consisting of the shaft 101 and the pulley 107, an electrical pulse is sent to the electromagnet 127, the mobile armature 128 of the latter is attracted and causes the pawl 125 to pivot upwards, the arm 122 of the pivoting lever 116 is released and, under the action of the energy storage spring 115, pivots in the opposite direction to that of the arrow f1, and the forked arm 118 of the pivoting lever pushes the sliding sleeve 104 to the right against the force of the return springs 108, thereby involving the keys 103 in this movement and causing their ends to disengage from the slots 106; the two rotating elements in question are uncoupled. The auxiliary motor 151 can now be energized so as to operate the dobby alone for the purpose of locating the shed. During the rotary movement of the shaft 101, the cam 131 pushes the roller 178 (FIG. 4), thereby causing the lever 175 to pivot in the direction of the arrow f2, the arm 179 of this lever pushes downwards the arm 181 (see FIG. 3 also) of the pivoting lever 116 which thus pivots in the direction of the arrow f1, and the energy storage spring 115 is again compressed and remains in this state, the arm 122 of the pivoting lever having again hooked onto the pawl 125. Under the action of the return springs 108, the keys 103 engage in the slots 106 as soon as they are located in front of the latter and the two rotating elements are again coupled. A pulse is sent to the electromagnet 127 each time it is required to make the shaft 101 rotate again in order to operate the dobby alone, the two above-mentioned elements being uncoupled.

As will be noted, above all in this application, it is particularly interesting that the cam 131 is in line with the roller 178 only when the device is uncoupled, in order to re-load the energy storage spring 115, otherwise, in the coupled position, the cam would strike the said roller at high speed each time the shaft 101 rotated, since this shaft, at that particular instant, would be rotating at a speed of between 300 and 500 revolutions/minute, which would obviously constitute a serious drawback.

In the embodiment shown in FIG. 3, the positive clutch or coupling element comprises a sliding sleeve 104 and keys 103 (for example two or four keys) one end of which engages in a slot 106 in the plate 155 and the nose of which rests against the sliding sleeve 104.

This arrangement increases the number of parts in the device and hence its price; moreover, the force required to disengage the keys may require a relatively strong uncoupling spring.

The embodiment shown in FIGS. 5 to 7 overcomes these drawbacks due to the fact that the sliding positive clutch is a sleeve which has a plurality of teeth designed to engage in slots in the driven element. More particularly, the teeth are four in number and are arranged so as to engage after one complete revolution of the drive shaft.

According to this arrangement, the assembly shown in FIG. 3, consisting of a sleeve (104), keys (103) and a disk carrying a cam (131), all of which are mounted on a bushing (153), is advantageously replaced by a single grooved sleeve (204) shown in FIGS. 5, 6a and 6b.

All of the other elements of the device shown in FIG. 3 are identical as regards function, in particular the forked lever (116), two arms (118) of which rest on an annular shoulder (221) of the sleeve (204), another arm (122) of which cooperates with a pawl (125) actuated by an electromagnet (127) and a last arm (181) of which is actuated by the cam (231) via the bent lever (175). So as to facilitate comparison between the two embodiments, the elements in the latter arrangement have reference numbers multiplied by 100, compared with those in FIG. 3 which perform the same function, and the unchanged elements retain the same reference numbers.

According to this latter arrangement, the grooved sleeve is locked in rotation with the main shaft (101) by a plurality of grooves (241), but is able to slide longitudinally on the said shaft (101).

The grooved sleeve (204) has, on its end which cooperates with a pulley (107), a plurality of teeth (203).

By way of a non-limiting example, the sleeve (204) has four teeth (203) arranged on a shoulder (243) and designed to cooperate with four slots (not shown) in the pulley (107). If coupling is to take place at the end of one complete revolution of the shaft (101) the instant of coupling, the four teeth (203) will be arranged in the manner shown in FIG. 2a. According to this special non-limiting arrangement, two opposite teeth are offset on the same side relative to the diameter parallel to their common axis of symmetry, as are the other two teeth.

So as to facilitate engaging of the teeth during coupling, the teeth (203) have lateral chamfers (246), shown in FIGS. 5, 6a and 7, and the corners (247) are cut.

However, the angle ($\alpha$) of the chamfers (246), measured as shown in FIG. 7, must not be so great that it prevents the teeth from disengaging at high speed despite the presence of the retaining springs (108).

By way of example, for a torque of 30 m/kg on the dobby and an overall axial load of approximately 50 to 60 kg resulting from the springs, the angle ($\alpha$) is calculated at 11° and the chamfers extend over at least a part, for example a half, of the lateral faces of the teeth.

Moreover, a cam (231) is integrally fixed to the sleeve (204) so as to be displaced and so as to rotate with it.

The said cam (231) is arranged at the opposite end to that which carries the shoulder (243) and the teeth (203), and its function is identical to that of the cam (131) of the device shown in FIG. 3.

A plurality of recesses (248) is provided for guiding the return springs (108) one end of which rests on an annular shoulder (249) of the cylindrical sleeve.

Obviously, without going outside the scope of the present invention, it is possible to choose, for the sleeve, variations in embodiment which are identical as regards function, or, it is possible to use the sleeve described above with the type of lever used in the first embodiment described with reference to FIGS. 1 and 2.

I claim:

1. Device for temporarily uncoupling two coaxial rotating elements, at least one of which is a drive element, by means of a positive clutch which slides on the drive element and which is subjected, in the coupling direction, to the action of a return spring and, in the uncoupling direction, to the effect of an electromagnet, comprising:
    (a) an energy storage spring capable of acting on the sliding positive clutch in the direction in which uncoupling is performed, with a force greater than the force of the return spring,
    (b) a cam connected to the drive element and designed to tension the said energy storage spring,
    (c) a pawl designed to keep the energy storage spring tensioned,
    (d) and a mechanical linkage between the pawl and the mobile armature (28,128) of the electromagnet designed to cause the release of the energy storage spring in response to the action of the electromagnet.

2. Device as claimed in claim 1, wherein the energy storage spring is connected to a lever which can pivot on a spindle mutually perpendicular to the axis of the abovementioned rotating elements and which has several arms, one of which is connected to the sliding positive clutch whereas another one cooperates with the pawl, the cam cooperating with the said lever.

3. Device as claimed in claim 2, wherein the cam cooperates with the pivoting lever by means of an auxiliary lever which can pivot on a spindle parallel to the axis of the abovementioned rotating elements and which cooperates with a third arm of the abovementioned pivoting lever.

4. Device as claimed in claim 1, wherein the cam is locked in rotation with the sliding positive clutch.

5. Device as claimed in claim 4, wherein the cam is also integrally fixed to the sliding positive clutch as regards displacement and is able to cooperate with the pivoting lever only when the device is uncoupled.

6. Device as claimes in claim 1, wherein the sliding positive clutch is a sleeve which has a plurality of teeth designed to engage in the slots in the driven element.

7. Device as claimed in claim 6, wherein the sliding positive clutch has four teeth.

8. Device as claimed in claim 6, wherein the teeth are arranged so as to engage after one complete revolution of the drive shaft.

9. Device as claimed in claim 6, wherein the teeth have lateral chamfers.

10. Device as claimed in claim 9, wherein the angle of the lateral chamfers is equal to 11°.

11. The combination of the device as claimed in claim 1 and a weaving loom, in which the rotating drive element is a shaft connected at one end to the dobby of the loom and at the other end to the auxiliary motor which operates the same, whereas the other rotating element is connected to the crankshaft of the loom and to the main motor of the loom.

* * * * *